United States Patent
Bays

(10) Patent No.: US 12,511,450 B2
(45) Date of Patent: Dec. 30, 2025

(54) ELECTRIC VEHICLE DRIVE TRAIN DEVELOPMENT TOOL

(71) Applicant: Cummins Inc., Columbus, IN (US)

(72) Inventor: Mark N. Bays, Columbus, IN (US)

(73) Assignee: Cummins Inc., Columbus, IN (US)

(*) Notice: Subject to any disclaimer, the term of this patent is extended or adjusted under 35 U.S.C. 154(b) by 878 days.

(21) Appl. No.: 17/833,564

(22) Filed: Jun. 6, 2022

(65) Prior Publication Data

US 2022/0391556 A1  Dec. 8, 2022

Related U.S. Application Data

(60) Provisional application No. 63/197,636, filed on Jun. 7, 2021.

(51) Int. Cl.
| | |
|---|---|
| *G06F 30/15* | (2020.01) |
| *G06F 30/12* | (2020.01) |
| *G06F 111/20* | (2020.01) |

(52) U.S. Cl.
CPC ............ *G06F 30/15* (2020.01); *G06F 30/12* (2020.01); *G06F 2111/20* (2020.01)

(58) Field of Classification Search
CPC ....... G06F 30/15; G06F 30/12; G06F 2111/20
USPC .......................................................... 703/2
See application file for complete search history.

(56) References Cited

U.S. PATENT DOCUMENTS

| | | | | |
|---|---|---|---|---|
| 2004/0263099 | A1* | 12/2004 | Maslov | B60L 50/20 318/400.24 |
| 2005/0052080 | A1* | 3/2005 | Maslov | H02K 16/04 307/10.1 |
| 2011/0017529 | A1* | 1/2011 | Durney | B60L 7/18 180/65.1 |
| 2016/0375782 | A1* | 12/2016 | Liu | B60L 58/12 320/109 |
| 2016/0375785 | A1* | 12/2016 | Liu | B60L 15/20 701/22 |
| 2016/0375786 | A1* | 12/2016 | Liu | B60K 35/10 701/22 |
| 2016/0375787 | A1* | 12/2016 | Liu | B60L 58/12 701/22 |

(Continued)

*Primary Examiner* — Justin C Mikowski
(74) *Attorney, Agent, or Firm* — Faegre Drinker Biddle & Reath LLP

(57) ABSTRACT

A computer-implemented tool for developing electric or hybrid electric vehicle electrical components systems. Embodiments comprise a database component, a user interface component, and a processing component. The database component may store drive train components information associated with each of a plurality of drive train components, and accessory components information associated with each of a plurality of accessory components. The user interface component may be configured to enable a user to select, display and interconnect icons representing one or more of the drive train components and one or more of the accessory components as an electrical components system, to input vehicle parameters, and to display computed specification analyses. The processing component may be coupled to the database component and the user interface component, and configured to compute specification analyses for the electrical components system based on the associated drive train components information, accessory components information and the vehicle parameters.

4 Claims, 4 Drawing Sheets

(56) References Cited

U.S. PATENT DOCUMENTS

2022/0391556 A1* 12/2022 Bays ..................... G06F 30/12
2023/0341043 A1* 10/2023 Garmel ............... F16H 57/0457

* cited by examiner

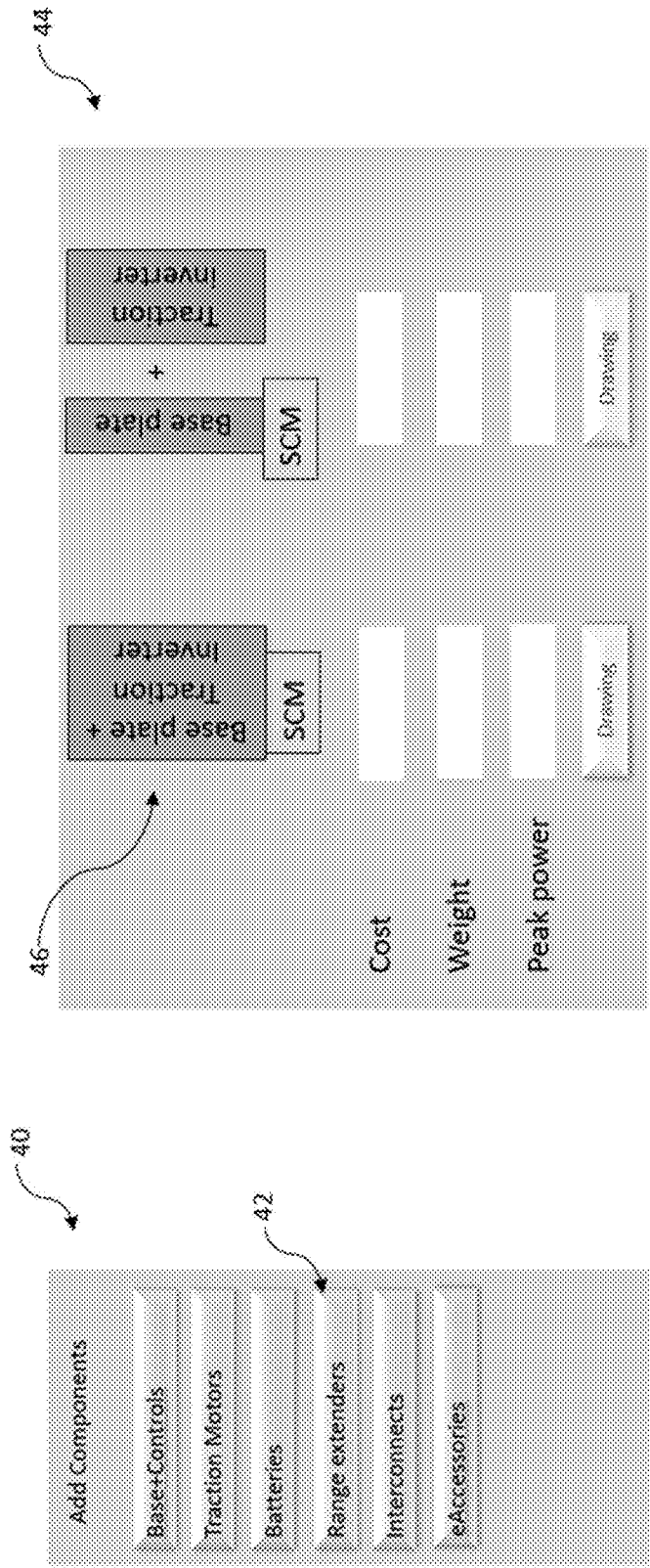

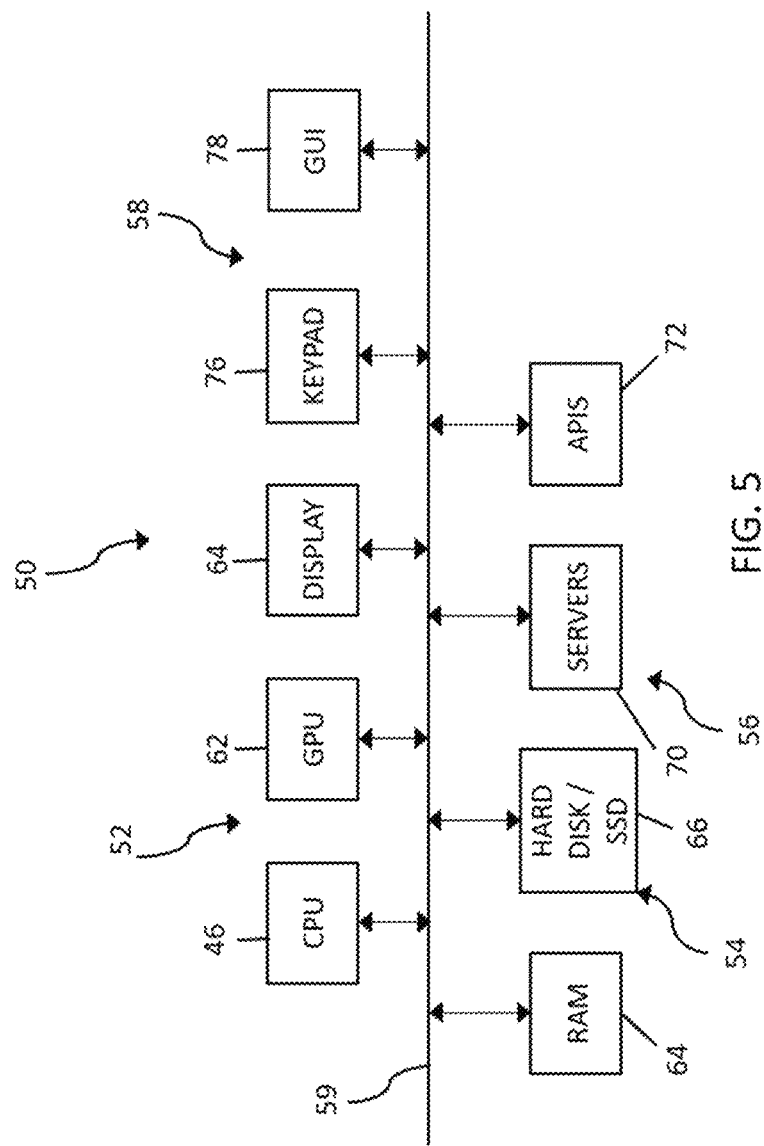

ELECTRIC VEHICLE DRIVE TRAIN DEVELOPMENT TOOL

REFERENCE TO RELATED APPLICATIONS

This application claims the benefit of U.S. Provisional Application No. 63/197,636 filed Jun. 7, 2021 and entitled Electric Vehicle Drive Train Development Tool, which is incorporated herein by reference in its entirety and for all purposes.

Reference is hereby made to U.S. application Ser. No. 17/314,299 filed May 7, 2021 and entitled Electrical Interconnect System For An Electric Vehicle, which is incorporated herein by reference in its entirety and for all purposes.

FIELD

This disclosure relates generally to electric vehicle drive trains. Embodiments include a tool and method for developing electric vehicle drive trains.

BACKGROUND

Electric and hybrid vehicles include a relatively large number of electrical drive train and accessory components. Examples include motors, batteries, interconnects for connecting the components, inverters, air compressors, heaters, power steering pumps and accessory inverters. Each of the components may be available in many variations (e.g., makes and models) having different geometry, weight and performance specifications. Electric motors, for example, may be characterized by specifications such as continuous power curve, peak power curve, efficiency map and voltage limitations. Batteries may be characterized by specifications such as storage capacity, voltage limitations, power delivery capability, and parameters describing degradation rates. Interconnect cables may have different current carrying capacities and lengths. Accessory components may be characterized by peak power consumption and continuous power consumption specifications. Each such component may be characterized by a customer orderable part number, a drawing and other information such as connection points.

During the design and development of an electric vehicle, the drive train and accessory components are selected to meet the applications and missions of the vehicles into which those components will be incorporated. Factors and parameters associated with a vehicle or its mission, at least some of which may not be related to the drive system components themselves, may be considered during the design and development of the drive train. Such parameters may include, for example, vehicle weight (e.g., other than the drive system), tire parameters such as diameter and rolling resistance coefficient, axle/transmission specifications such as torque capacity and drive ratio, air drag coefficient, model identifying information, and mission parameters such as maximum grade, brake energy usage, coefficients describing regenerative braking, route data and charging opportunity information.

There remains a need for improved tools and methods for use by designers and developers of electric vehicles. Tools and methods enhancing such designer's and developer's abilities to develop electric and hybrid electric drive trains suitable for a specific vehicle applications and missions would be especially desirable.

SUMMARY

Disclosed embodiments include a software tool that can used to enhance the development of electric and hybrid electric drive trains. One example is a computer-implemented tool for developing electric or hybrid electric vehicle electrical components systems, comprising: a database component for storing: drive train components information including identifying information, electrical specifications and/or physical specifications associated with each of plurality of drive train components, wherein the drive train components include at least (1) a plurality of electric motors, (2) a plurality of batteries, and (3) a plurality of electrical interconnects; and accessory components information including identifying information, electrical specifications and/or physical specifications associated with each of a plurality of accessory components, wherein the accessory components optionally include one or more of (1) a pump, (2) a compressor, or (3) a heater; a user interface component configured to enable a user to: select, display and interconnect icons representing one or more of the drive train components and one or more of the accessory components as an electrical components system; input vehicle parameters, wherein the vehicle parameters include one or more of (1) vehicle weight, (2) tire parameters, (3) axle/transmission parameters, or (4) mission parameters; and display computed specification analyses; and a processing component coupled to the database component and the user interface component and configured to compute specification analyses for the electrical components system based on the associated drive train components information, accessory components information and the vehicle parameters.

In embodiments, the processing component is configured to compute specification analyses including one or more of (1) vehicle range, (2) vehicle gradeability, (3) vehicle weight, (4) drive system cost, (5) vehicle energy efficiency, (6) electrical current capacity vs. allowed limits for the interconnects, (7) range on a specific route, (8) battery life, or (9) hybrid drive system performance simulation. In embodiments, the processing component computes and displays at least some of the specification analyses in real time while a user is using the tool. In embodiments, the processing component is further configured to generate information representative of documents including one or more of (1) a bill of materials for the electrical components system, (2) the specification analyses, (3) an installation schematic diagram, (4) an offer quote, or (5) drawings of one or more of the selected drive train components, selected accessory components or electrical components system.

Another example is a method for operating a computing system including one or more processors, comprising: providing a graphical user interface to: enable a user to select, display and interconnect icons representing (1) one or more of a plurality of drive train components and (2) one or more of a plurality of accessory components as an electrical components system for an electric or hybrid electric vehicle, wherein: the plurality of drive train components include (1) a plurality of electric motors, (2) a plurality of batteries, and (3) a plurality of electrical interconnects; and the plurality of accessory components optionally includes one or more of (1) a hydraulic pump, (2) a compressor, or (3) a heater; and enable a user to input vehicle parameters, wherein the vehicle parameters include one or more of (1) vehicle weight, (2) tire parameters, (3) axle/transmission parameters, or (4) mission parameters; accessing and receiving: drive train components information including identifying information, electrical specifications and/or physical specifications associated with each of the drive train components of the displayed electrical components system; and accessory components information including identifying information, electrical specifications and/or physical specifications associated with each of the accessory components of the displayed electrical components system; computing specification analyses for the displayed electrical components system based on the drive train components information, accessory components information and vehicle parameters; and displaying the computed specification analyses.

BRIEF DESCRIPTION OF THE DRAWINGS

FIG. 3 is a diagrammatic illustration of an exemplary menu of selectable components categories of the graphical user interface of the software tool, in accordance with embodiments.

FIG. 4 is a diagrammatic illustration of an exemplary menu selectable components of the graphical user interface of the software tool, in accordance with embodiments.

FIG. 5 is a diagrammatic illustration of an exemplary computer system to implement the software tool, in accordance with embodiments.

DETAILED DESCRIPTION

Figure 1:
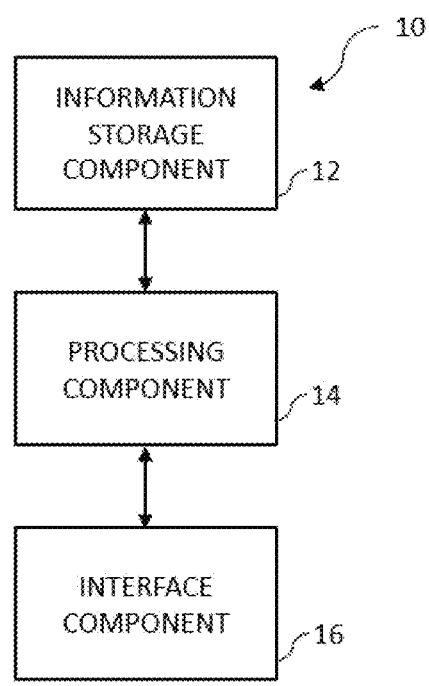
FIG. 1 is a diagrammatic illustration of a software tool in accordance with embodiments.

FIG. 1 is a diagrammatic illustration of a tool 10 in accordance with embodiments that can be operated in accordance with computer-implemented methods disclosed herein to design, develop and provide other functionality in connection with electric and hybrid electric vehicles. In particular, tool 10 can be used to design, develop and provide associated functions in connection with drive trains for electric and hybrid electric vehicles. The illustrated embodiments include information storage component 12, processing component 14 and interface component 16.

Information storage component 12 stores data and other information used by the tool 10, including information about electric drive train components and electric accessory components that may be incorporated into a vehicle electrical components system. Using the user interface component 14, which may include a graphic user interface (GUI) and/or text fields, a designer or other user can select, display and interconnect icons or other representations of available drive train components and accessory components to represent or define a specific electrical components system for the vehicle. User interface component 14 can be used to input other, e.g., non-drive train related parameters of the vehicle in which the specific electrical components system is intended to be incorporated. In effect, the user operates the user interface component 14 to define or specify a particular electrical components system for a vehicle having certain defined characteristics that may be impacted by, or that may impact the operation of, the electrical components system. The processing component 16 is coupled to the information storage component 12 and user interface component 14, and computes specification analyses for the user-defined electrical components system. The specification analyses are computed based on the information associated with the drive train components and accessory components of the user-defined electrical components system (e.g., the particular interconnected arrangement of the drive train and accessory components), and the vehicle parameters input by the user. The computed specification analyses can be displayed to the user by the user interface component 14.

Examples of the information stored by information storage component 12 include:
Drive train components information
Accessory components information
User input information including vehicle parameters
Information representative of electrical components systems defined by users
Computed specification analyses for the electrical components systems Tool 10 supports a user's ability to simulate electrical components systems having any of a wide range of electric drive train components and electric accessory components. Examples of electric and other drive train components include:
A plurality of different electric motors
A plurality of different batteries and/or fuel cells
A plurality of different electrical interconnects (non-limiting examples are described in the application No. 63/197,636 and Ser. No. 17/314,299 entitled Electrical Interconnect System For An Electric Vehicle identified above in the Reference To Related Applications section that are incorporated herein by reference
A plurality of different inverters
A plurality of different base plates or system control modules (SCM)
Hydrogen fuel cells and associated hydrogen storage systems
Hybrid drive units or range extenders including conventional ICE power sources and fuel storage systems Examples of accessory components include:
A plurality of hydraulic pumps such as those for power steering systems
A plurality of compressors such as those for air conditioners
A plurality of heaters or other thermal management systems (TMS)
DC to DC converter to provide power for vehicle systems such as lights, dash display etc.

For each of the electric and other drive train components and accessory electrical or other components supported by tool 10, information storage component 14 stores associated performance or electrical specifications and/or physical specifications. Examples of physical specification information that can be stored in connection with each drive train or accessory component includes:
Unique or orderable part number
Weight
Geometry such as dimensions
Drawings
Number and type of connection points Examples of performance or electrical specification information that can be stored in connection with drive train and/or accessory components includes:
Motors—continuous power curve, peak power curve, efficiency map, voltage limitations, waste heat generation, cooling system parameters such as coolant flow restriction and heat transfer coefficients
Batteries and fuel cells—storage capacity, voltage, limitation, power delivery capability, parameters describing degradation rates, efficiency, waste heat generation, cooling system parameters such as coolant flow restriction and heat transfer coefficients
Interconnects—current carrying capacity, accessory components—peak power consumption. continuous power consumption, cooling system parameters such as pressures, flows, heat transfer coefficients, heat generation and removal capacity In embodiments, the information storage component 12 may be a component physically located at the facility of the processing component 14 and/or the user interface component 16. Additionally or alternatively, the information storage component 12 may be located at a location remote from the processing component 14 and/or the user interface component 16, and coupled to the processing component and/or user interface component by a local or wide area network such as the internet. In embodiments, the information storage component may be operated and/or maintained by the entity providing the processing component 14 and/or user interface component 16, or by a third party entity. In embodiments, the components of the tool 10 may be hosted by a third party, and the functionality of the tool provided as a service (e.g., software as a service, or SaaS).

User interface component 16 may include graphical user interface (GUI) and/or text-based functionality to enable a user to input information and operate the tool 10. In embodiments, the user interface component 16 enables a user to select and/or input parameters or information of a vehicle in which the electrical components system being designed is to be incorporated. The vehicle information may include information not directly related to the drive train components and/or the accessory components, but which will impact the performance of the vehicle into which the electrical components system is to be incorporated. The vehicle information may be stored by the information storage component 12. Examples vehicle parameters of information that can used by the system 10 include:

- Vehicle weight (e.g., other than that of the drive system)
- Tire parameters such as diameter and/or rolling resistance coefficient
- Axle/transmission parameters such as torque capacity and/or drive ratio
- Air drag coefficient
- Model or other identifying information
- Application or mission parameters (e.g., maximum grade, brake energy usage, coefficients describing regenerative braking, route data, charging opportunity information)

In embodiments, the vehicle information is input to tool 10 through the user interface component 16. Alternatively or in addition, a user can use or operate the user interface component 16 to access vehicle information from other sources, including third party sources (e.g., through a network).

When using the tool 10, a user will operate the user interface component 16 to select electric drive train components, accessory electrical components and/or other associated components to be incorporated into an electrical components system. As described in greater detail below, the components such as drive train components and/or accessory electrical components can be selected from lists or menus, such as drop-down lists, of the available components supported by the tool 10. Text or visual representations of the selected components, such as icons, can be displayed by the user interface component 16. The electrical interconnections between the selected components can also be defined by the user through operation of the user interface component 16 (e.g., the user can position the electrical interconnects to connect the desired components). In embodiments, the user interface component 16 may be operated to define and provide a visual representation of the selected components including the electric drive train components, accessory electrical components and the interconnections of these components. By this operation of the user interface component 16, the user is able to define a digital representation or simulation of the particular electrical components system.

Processing component 14 computes specification analyses for the electrical components systems defined by the user. The specification analyses are based on (1) the drive train components information associated with the electric and other drive train components incorporated into the electrical components system, (2) the accessory components information associated with the accessory electrical and other components incorporated into the electrical components system, and/or (3) the vehicle parameters for the vehicle into which the electrical components system is to be incorporated (e.g., as inputted or selected by the user). Examples of the types of information that may be generated by the processing component 14 in connection with the specification analyses include:

- Vehicle range
- Vehicle gradeability (e.g., maximum grade that the vehicle can climb)
- Total vehicle weight
- Energy efficiency (e.g., kWh/mile)
- Electrical current capacity vs. allowed limits for the electrical interconnects
- Range on a specific route
- Battery life
- Hybrid drive system performance Conventional or otherwise known algorithms can be used to define the relationships between the drive train components information, accessory components information and/or vehicle parameters, and the specification analyses computed based on those elements of information and parameters. The following are some non-limiting examples: Total vehicle weight may be the sum of the weights of the various elements. Maximum grade capability can be calculated from total weight and motor/system performance characteristics using classical physics. Range can be estimated by first estimating energy consumption per mile using correlations with parameters such as weight, drag coefficients and the efficiency of the drive system components, and then divide that into the on-board energy storage capacity from sources such as a battery or hydrogen storage for a fuel cell. Range on a specific route can be estimated using time resolved vehicle mission simulation software as has been a commonly available practice. Estimation of battery life may be computed using approaches described in publicly available research papers.

The computed specification analyses are displayed by the user interface component 16 or otherwise presented to the user (e.g., in printed form). In embodiments, certain information types of the specification analyses may be generated relatively quickly (e.g., in real time or near real time) following the definition of the electrical components system by the user. For example, one or more of vehicle range, vehicle gradeability, vehicle weight, drive system cost, energy efficiency and/or electrical current capacity of the interconnects may be computed and displayed during the time frame or session that the user is operating the tool 10. The user can thereby quickly receive feedback as they are selecting components to include in an electrical components system. Feedback of this type may enable the user to understand how their selections affect important resultants and to adjust the selections accordingly. As described below, for example, these specification analyses may be presented on an output pane of a GUI used to select drive system configurations.

Other types of specification analyses, such as for example simulation type analyses such as range on a specific route, battery life and/or the hybrid drive system simulation performance, may require longer times for computation, and may be presented to the user following the time frame that the user was operating the tool 10 to define the electrical system components. The user experience may be interrupted if every change to a drive system configuration resulted in automatic execution of the computed specification analyses. For example, specification analyses of these types may be executed at the user's request (e.g., by pressing a button on a GUI) after the user is satisfied with the drive system configuration and would like a more detailed analysis.

Tool 10 may also be configured to generate and present documents capable of documenting and implementing electrical components systems developed using the tool. For example, processing component 14 may be configured to assemble the documents using information associated with the drive train and accessory components stored in the information storage component 12. In embodiments, the assembly of the documents may be initiated at the user's request (e.g., by pressing a button on a GUI). The documents may he presented by a printer (not shown in FIG. 1) coupled to the processing component 14. Examples of the types of documents that may be created by the tool 10 include:

Bill of materials (e.g., including part nos. quantities, names, etc.)
    Specification analyses
    Installation schematic (e.g., in a form suitable for use in vehicle assembly instructions and/or service manuals)
    Quotes with prices and commercial terms
    Customer drawings for components of the developed systems In embodiments, the design documents may be in standardized formats based on a format selected by the user (e.g., using the user interface component 16). In embodiments, the user may have limited or no control over which elements are included in the documents other than those based on the developed electrical components system. For example, when the user requests the generation of the documents, the tool 10 generates a file in a standard formation (e.g., PDF) with the information.

Figure 2:
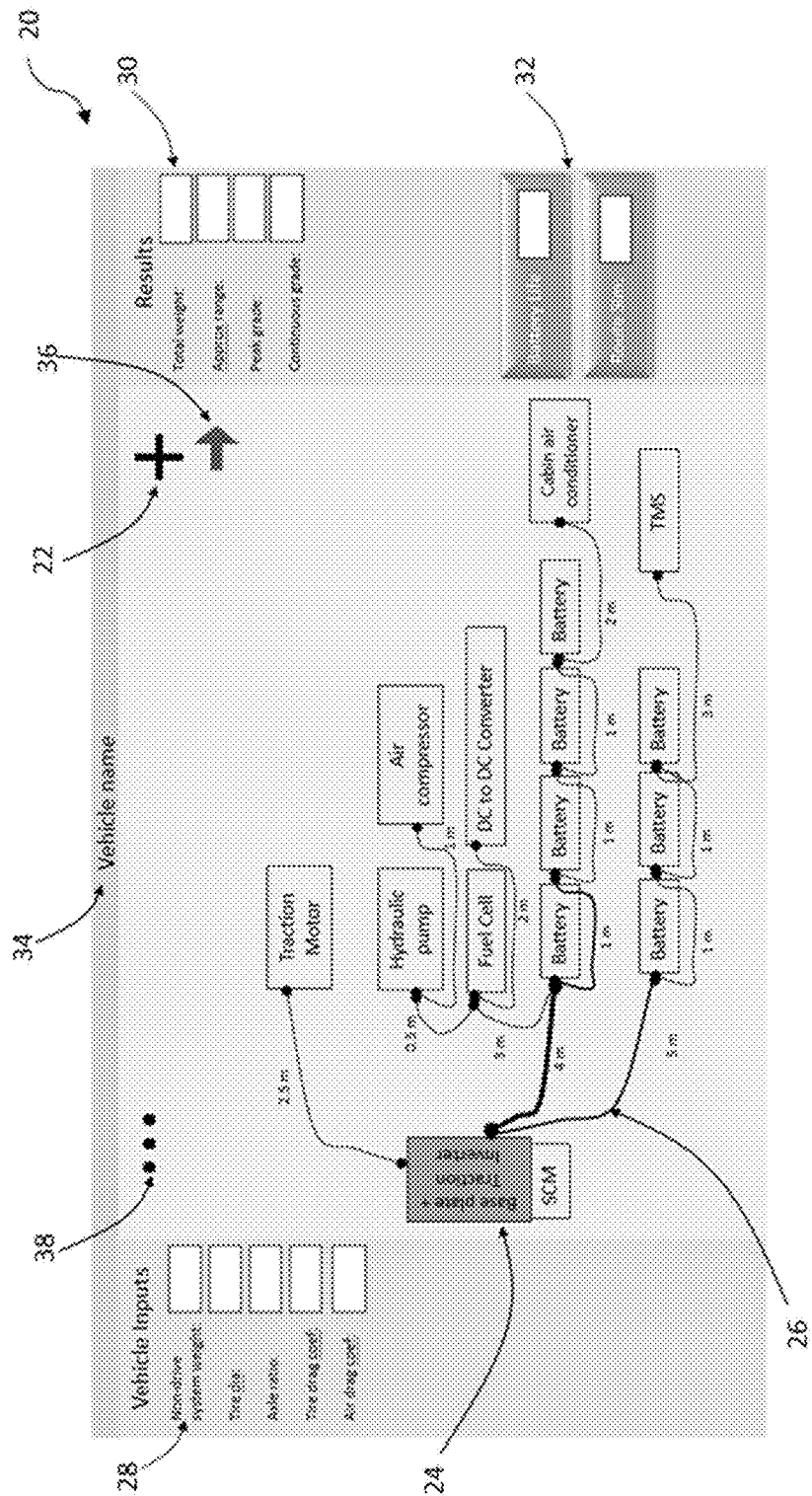
FIG. 2 is a diagrammatic illustration of an exemplary graphical user interface of the software tool, in accordance with embodiments.

FIG. 2 is a diagrammatic illustration of an exemplary GUI 20 that may be generated by the tool 10. The illustrated embodiment includes an add element button 22 that can be actuated by the user to access a library (e.g., through a drop down menu) of categories of standard parts 24 including the drive train components and the accessory components. Icons representing exemplary interconnected (by interconnects 26) drive train components such as a base plate, inverter, system control module (SCM), traction motor, fuel cell and batteries, all of selected by a user as components of a developed drive components system or configuration, are shown in FIG. 2. Also shown in FIG. 2 are icons representing accessory components such as a hydraulic pump, air compressor, DC to DC converter, cabin air conditioner and thermal management system (TMS) interconnected (by interconnects) to the drive train components, all selected by a user as components of the drive train configuration. The interconnects 26 are shown as lines. Color and/or weight of the lines representing the interconnects 26 may represent electrical capacity analyses results. Numbers such as those shown in FIG. 2 may represent lengths of the interconnects 26. In embodiments, the user may select the lengths of the interconnects 26 from a drop down menu and hovering over the associated text.

A pane 28 includes boxes that can be used by the user to input the vehicle parameters. Non-drive system weight, tire diameter, axle ratio, tire drag coefficient and air drag coefficient are shown for purposes of example in FIG. 2. A pane 30 can present specification analyses such as those that are computed and automatically displayed as the user is developing the electrical components system. Total weight, approximate range, peak grade and continuous grade are examples of such specification analyses shown in FIG. 2. Buttons such as 32 can be actuated by the user to cause other specification analyses to be computed (e.g., those that require longer times for computation). The example shown in FIG. 2 includes buttons 32 enabling a user to request battery life and route simulation analyses for the electrical components system defined in the tool 10. Results for the requested analyses may be shown in the output panes associated with the buttons 32. As shown, the GUI 20 may also include a pane 34 enabling the user to name or otherwise identify the electrical components system being developed, a button such as 36 enabling the user to initiate the generation of the design documents, and buttons such as 38 for other functions such as for example saving, loading, etc.

FIG. 3 is a diagrammatic illustration of a drop down menu 40 that can be presented by the interface component 16 when the user selects the add elements button 22 (e.g. as shown in FIG. 2). The exemplary menu 40 includes component buttons 42 allowing the user to select and add components from categories such as drive train components, accessory components and other components such as bases and controls, motors, batteries, range extenders, interconnects and other electrical system accessories. One or more of the component buttons 42, when actuated, may present additional and more extensive lists or menus of components in the selected category that are available to the user. FIG. 4, for example, is a diagrammatic illustration of a GUI display 44 illustrating selectable options for bases and controls that may be presented to the user in response to the actuation of the base and control component button 42. As shown in FIG. 4, display 44 includes panes 46 showing user-selectable component options, and associated boxes in which the user can enter specific parameters (e.g., cost, weight peak power) for those parameters. The illustrated embodiments of the panes 46 also include buttons that can be actuated by the user to request the generation of drawings for the selected components.

FIG. 5 is a diagrammatic illustration of an exemplary computer system 50 that may be used to implement the tool 10 in accordance with embodiments. The illustrated embodiments of computer system 50 comprise processing components 52, storage components 54, network interface components 56 and user interface components 58 coupled by a system network or bus 59. Processing components 52 may, for example, include central processing unit (CPU) 60 and graphics processing unit (GPU) 62, and provide the processing functionality of the processing component 14 and user interface component 16. The storage components 54 may include RAM memory 64 and hard disk/SSD memory 66, and provide the storage functionality of the information storage component 12. For example, operating system software used by the processing components 52 and the software used by the processing component 14 to perform the specification analyses and other methods described herein may be stored by the storage components 54. In embodiments, the network interface components 56 may include one or more web servers 70 and one or more application programming interfaces (APIs) 72 (e.g., for coupling the computer system 50 third party or other information sources). Examples of user interface components 58 include display 74, keypad 76 and graphical user interface (GUI) 78. Embodiments of computer system 50 may include other conventional or otherwise known components to provide functionality in accordance with embodiments described herein.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

The invention claimed is:

1. A computer-implemented tool for developing electric or hybrid electric vehicle electrical components systems, comprising:
  a database component for storing:
    drive train components information including identifying information, electrical specifications and/or physical specifications associated with each of plurality of drive train components, wherein the drive train components include at least (1) a plurality of electric motors, (2) a plurality of batteries, and (3) a plurality of electrical interconnects; and
    accessory components information including identifying information, electrical specifications and/or physical specifications associated with each of a plurality of accessory components, wherein the accessory components optionally include one or more of (1) a pump, (2) a compressor, or (3) a heater;
  a user interface component configured to enable a user to:
    select, display and interconnect icons representing one or more of the drive train components and one or more of the accessory components'as an electrical components system;
    input vehicle parameters, wherein the vehicle parameters include one or more of (1) vehicle weight, (2) tire parameters, (3) axle/transmission parameters, or (4) mission parameters; and
    display computed specification analyses; and
  a processing component coupled to the database component and the user interface component and configured to compute specification analyses for the electrical components system based on the associated drive train components information, accessory components information and the vehicle parameters, wherein the processing component is configured to:
    compute specification analyses including one or more of (1) vehicle range, (2) vehicle gradeability, (3) vehicle weight, (4) drive system cost, (5) vehicle energy efficiency, (6) electrical current capacity vs. allowed limits for the interconnects, (7) range on a specific route, (8) battery life, or (9) hybrid drive system performance simulation;
    compute and display at least some of the specification analyses in real time while a user is using the tool; and
    generate information representative of documents including one or more of (1) a bill of materials for the electrical components system, (2) the specification analyses, (3) an installation schematic diagram, (4) an offer quote, or (5) drawings of one or more of the selected drive train components, selected accessory components or electrical components system.

2. A method for operating a computing system including one or more processors, comprising:
  providing a graphical user interface to:
    enable a user to select, display and interconnect icons representing (1) one or more of a plurality of drive train components and (2) one or more of a plurality of accessory components as an electrical components system for an electric or hybrid electric vehicle, wherein:
      the plurality of drive train components includes (1) a plurality of electric motors, (2) a plurality of batteries, and (3) a plurality of electrical interconnects; and
      the plurality of accessory components optionally includes one or more of (1) a hydraulic pump, (2) a compressor, or (3) a heater; and
    enable a user to input vehicle parameters, wherein the vehicle parameters include one or more of (1) vehicle weight, (2) tire parameters, (3) axle/transmission parameters, or (4) mission parameters;
  accessing and receiving:
    drive train components information including identifying information, electrical specifications and/or physical specifications associated with each of the drive train components of the displayed electrical components system; and
    accessory components information including identifying information, electrical specifications and/or physical specifications associated with each of the accessory components of the displayed electrical components system;
  computing specification analyses for the displayed electrical components system based on the drive train components information, accessory components information and vehicle parameters, wherein computing the specification analyses includes computing in real time while a user is using the tool at least some of the specification analysis including one or more of (1) vehicle range, (2) vehicle gradeability, (3) vehicle weight, (4) drive system cost, (5) vehicle energy efficiency, (6) electrical current capacity vs. allowed limits for the interconnects, (7) range on a specific route, (8) battery life, or (9) hybrid drive system performance simulation; and
  displaying at least some of the computed specification analyses in real time while a user is using the tool; and
  generating information representative of documents including one or more of (1) a bill of materials for the electrical components system, (2) the specification analyses, (3) an installation schematic diagram, (4) an offer quote, or (5) drawings of one or more of the selected drive train components, selected accessory components or electrical components system.

3. A method for operating a computer-implemented tool to facilitate development of electric or hybrid electric vehicle electrical components systems, comprising:
  providing a user with access to a graphical user interface enabling the user to model the electrical components systems, including to:
    select, display and interconnect icons representing one or more drive train components and one or more accessory components of the electrical components system, wherein the drive train components include at least (1) a plurality of electric motors, (2) a plurality of batteries, and (3) a plurality of electrical interconnects, and wherein the plurality of accessory components optionally includes one or more of (1) a hydraulic pump, (2) a compressor, or (3) a heater;

input vehicle parameters, wherein the vehicle parameters include one or more of (1) vehicle weight, (2) tire parameters, (3) axle/transmission parameters, or (4) mission parameters; and display at least some computed specification analyses in real time while the user is using the tool;

receiving, from the user, modeled system information representative of the modeled electrical components systems; and compute at least some of the specification analyses for the modeled electrical components systems based on the modeled system information in real time while the user is using the tool, wherein computing the specification analyses includes computing one or more of (1) vehicle range, (2) vehicle gradeability, (3) vehicle weight, (4) drive system cost, (5) vehicle energy efficiency, (6) electrical current capacity vs. allowed limits for the interconnects, (7) range on a specific route, (8) battery life, or (9) hybrid drive system performance simulation; and generating information representative of documents including one or more of (1) a bill of materials for the electrical components system, (2) the specification analyses, (3) an installation schematic diagram, (4) an offer quote, or (5) drawings of one or more of the selected drive train components, selected accessory components or electrical components system.

4. The method of claim 3, further comprising:

generating information representative of documents including one or more of (1) a bill of materials for the electrical components system, (2) the specification analyses, (3) an installation schematic diagram, (4) an offer quote, or (5) drawings of one or more of the selected drive train components, selected accessory components or electrical components system; and providing the user with access to the information representative of the documents via the user interface.

* * * * *